(12) United States Patent
Yoshizawa et al.

(10) Patent No.: US 6,682,187 B2
(45) Date of Patent: Jan. 27, 2004

(54) INK-JET RECORDING METHOD (76) Inventors: Tomomi Yoshizawa, 1, Sakura-machi, Hino-shi 191-8511 (JP); Yasuhiko Kawashima, 1, Sakura-machi, Hino-shi 191-8511 (JP)

( * ) Notice: Subject to any disclaimer, the term of this patent is extended or adjusted under 35 U.S.C. 154(b) by 124 days.

(21) Appl. No.: 09/954,815

(22) Filed: Sep. 12, 2001

(65) Prior Publication Data
US 2002/0063766 A1 May 30, 2002

(30) Foreign Application Priority Data

Sep. 13, 2000 (JP) ........................................ 2000-277928
Mar. 26, 2001 (JP) ........................................ 2000-087328

(51) Int. Cl.$^7$ ................................................ B41J 2/01
(52) U.S. Cl. ........................ 347/100; 347/63; 347/65; 347/64; 347/95
(58) Field of Search .......................... 347/100, 96, 63, 347/65, 64, 95

(56) References Cited

U.S. PATENT DOCUMENTS

| | | | | |
|---|---|---|---|---|
| 4,060,262 A | * | 11/1977 | Maierson | 427/150 |
| 4,688,056 A | * | 8/1987 | Noguchi et al. | 347/65 |
| 4,818,662 A | * | 4/1989 | Aono et al. | 430/348 |
| 4,847,188 A | * | 7/1989 | Komamura et al. | 430/545 |
| 5,331,344 A | * | 7/1994 | Miyagawa et al. | 347/63 |
| 5,762,812 A | * | 6/1998 | Narang | 216/27 |
| 5,837,753 A | * | 11/1998 | Caputo | 347/100 |
| 5,874,974 A | * | 2/1999 | Courian et al. | 347/65 |
| 6,086,197 A | * | 7/2000 | Kubota et al. | 347/96 |
| 6,439,698 B1 | * | 8/2002 | Patil | 347/64 |
| 6,485,551 B1 | * | 11/2002 | Kohsaka et al. | 106/31.27 |

FOREIGN PATENT DOCUMENTS

EP      1079019 A2  *  2/2001  ............. D06P/5/30

* cited by examiner

Primary Examiner—Stephen D. Meier
Assistant Examiner—Manish Shah
(74) Attorney, Agent, or Firm—Squire, Sanders & Dempsey (57) ABSTRACT

An ink-jet recording a water-based ink from an ink chamber through a nozzle hole, wherein the ink chamber contacting with the water-based ink is constructed by jointing plural construction members with an epoxy adhesive, and the water-based in contains a coloring material, a first organic solvent, and a second organic solvent each having properties of a specific organicity and inorganicity. This method enables to enhance the stability of ejection of ink droplets without shortening the life of the head.

19 Claims, 2 Drawing Sheets

INK-JET RECORDING METHOD

FIELD OF THE INVENTION

The present invention relates to an ink-jet recording method (hereinafter simply referred to as a recording method).

BACKGROUND OF THE INVENTION

In recent years, ink-jet recording techniques have made remarkable progress and have made it possible to obtain highly detailed images approaching conventional photography.

Consequently, ink-jet recording has been utilized in many fields.

As a result, in addition to obtaining highly detailed images, an increase in printing speed has been sought. Methods for increasing said printing speed include one in which the number of nozzles on the head is increased and the other in which the number of ink droplets per unit time, ejected from each head, is increased. However, the method, in which the number of nozzles is simply increased, is not preferred due to an increase in printer cost. In order to increase the printing speed without an increase in cost, it is required that more ink droplets per unit time are ejected.

As a result, 15 kHz or more is desired as the driving high frequency.

Along with the enhancement of high frequency driving and the scanning speed of the carriage accompanied with high speed recording, ink ejection tends to become unstable. When ink ejection becomes unstable, image quality is degraded due to a decrease in image density and formation of streak-like unevenness.

Considered as factors which make ejection unstable, are various types of reasons. First, insufficient refilling and dried nozzles are considered, and secondly the presence of bubbles in the head, non-uniformity of the ink, the degradation of adhesion section, and the like are also considered. However, it is difficult to be specific with some of the reasons.

As methods for improving the light fastness and bleeding of ink-jet images, ink comprised of pigments instead of ink comprised of dyes has received more attention. When a large amount of components such as pigments, which are insoluble in ink, are contained, the ejection of ink becomes unstable. It has been verified that such insoluble materials become an obstacle in ink injection and degrade the adhesion section.

Further, it is known that the adhesion section of the head is subjected to swelling due to water. In order to minimize said swelling, it has been investigated to utilize materials, which are barely subjected to swelling due to water, in said adhesive agents. On the other hand, in order to improve unstable ejection due to dried nozzles, it is effective to add water-soluble high-boiling point organic solvents into the ink. However, adhesive agents, which are barely subjected to swelling due to water, are more readily subjected to swelling due to water-soluble organic solvents. As a result, it has been found that such organic solvents tend to degrade the adhesion section of the head. Further, it has also been found that when the head is subjected to high frequency drive, a force applied to the head increases and specifically the adhesion section is degraded.

When such degradation of adhesive agents in the head occurs, ink leaks into the head. As a result, it becomes impossible to carry out printing, and the life of the head is shortened.

SUMMARY OF THE INVENTION

According to one embodiment of the present invention, an ink-jet recording method is provided, the method includes jetting a water-based ink from an ink chamber through a nozzle hole to an ink-jet recording media, wherein the ink chamber contacting with the water-based ink is constructed by jointing plural construction members with an epoxy adhesive, and wherein the water-based ink contains a coloring material, a first organic solvent, and a second organic solvent. A weight ratio of both the first organic solvent and the second organic solvent to the total weight of the water-based ink can be between about 10 and about 50%; a ratio of an inorganicity to an organicity can be between about 0.5 and about 2.4 for the first organic solvent and between about 2.5 and about 5.0 for the second organic solvent; and a weight ratio to a total weight of the water-based ink can be between about 0 and about 15% for the first organic solvent and between about 5 and about 50% for the second organic solvent.

DESCRIPTION OF SYMBOLS

| | |
|---|---|
| 1 | substrate |
| 2 | groove |
| 2a | ink chamber |
| 3 | electrode layer |
| 6 | adhesive agent |
| 8 | lid |
| 9 | ink chamber |
| 9' | dummy groove |
| 14 | upper plate |
| 15 | ink supply hole |

DETAILED DESCRIPTION OF THE INVENTION

The present invention will now be detailed.

The members contacting with the ink-jet ink of the present invention designate all of the components that form the ink flow channel (such as ink flow channel plate) and/or the ink nozzle hole (such as a nozzle hole plate) and contact with the ink-let ink. In this invention, it is preferable to use an epoxy adhesive to construct the ink-jet recording members at least in a part of constructing process.

The ink-jet recording method of the present invention is preferred to use ink comprised of water-based ink comprising colorants in an amount from 1 to 20 percent by weight of the ink-jet ink and water-soluble organic solvents in an amount from at least 10 percent by weight of the ink-jet ink.

The ink-jet ink is preferred to comprise water-soluble organic solvents at an inorganicity/organicity ratio of from 0.5 to 2.4 in an amount from 0 to 15 percent by weight of ink, and water-soluble organic solvents at an inorganicity/organicity ratio from 2.5 to 5.0 in an amount from 5 to 50 percent by weight of the ink.

The inorganicity/organicity ratios of the organic solvents are obtained based on the total ink. The recording head driving frequency is preferred to be 15 kHz to 50 kHz. And adhesive agents at the ink flow channel and the nozzle plate are epoxy based resins.

The ink flow channel of the present invention designates a path in which the ink-jet ink passes in the ink-jet recording head.

Examples of ink-jet recording heads used for the present invention are; piezoelectric-type head and thermal-type head. Of these, the piezoelectric-type head is preferably used.

Further, in the present invention described above, it is preferable that said ink comprises plural water-soluble organic solvents. One of which has an inorganicity/organicity ratio from 0.5 to 2.4 and is contained in an amount from 1 to 8 percent by weight. And another of which has an inorganicity/organicity ratio from 2.5 to 5.0 and is contained in an amount from 5 to 15 percent by weight.

The organicity of the present invention is a sum of values of a substituent in a molecule. These values are determined by counting unit 20 per carbon atom as well as relative vales based on carbon units. The calculation ca be done as follows.

Organicity=20×(carbon number which forms the target molecule)+ (the sum of the values of substituents)

Inorgnicity is determined based on OH group as unit 100 as well as relative values based on OH group. The sum of substituent values is call Inorganicity.

Examples of values of substituents are shown in the Table A.

TABLE A

| Substituent | Inorganicity Value | Organicity and Inorganicity Substituent | Organicity | Inorganicity |
|---|---|---|---|---|
| Ligh metal (salt) | 500 and more | $R_4Bi$—OH | 80 | 250 |
| Heavy metal (salt), Amine and $NH_4$ salt | 400 and more | $R_4Sb$—OH | 60 | 250 |
| —$AsO_3H_2$, >$AsO_2H$ | 300 | $R_4As$—OH | 40 | 250 |
| —$SO_2$—NH—CO—, N=N—$NH_2$ | 260 | $R_4P$—OH | 20 | 250 |
| \N+—OH, —$SO_3H$, —NH—$SO_2$—NH— | 250 | —$OSO_3H$ | 20 | 220 |
| —CO—NH—CO—NH—CO— | 250 | >$SO_2$ | 40 | 170 |
| \S—OH, —CO—NH—CO—NH— | 240 | >SO | 40 | 140 |
| —$SO_2$—NH— | 240 | —CSSH | 100 | 80 |
| —CS—NH—*, —CO—NH—CO—* | 230 | —SCN | 90 | 80 |
| =N—OH, —NH—CO—NH—* | 220 | —CSOH, —COSH | 80 | 80 |
| =N—NH—*, —CO—NH—$NH_2$ | 210 | —NCS | 90 | 75 |
| —CO—NH—* | 200 | —Bi< | 80 | 70 |
| \N→O | 170 | —$NO_2$ | 70 | 70 |
| —COOH | 150 | —Sb< | 60 | 70 |
| Lacton ring | 120 | —As<, —CN | 40 | 70 |
| —CO—O—CO— | 110 | —P< | 20 | 70 |
| Anthracene ring, Phnanthrene ring | 105 | —O—(—$CH_2$—$CH_2$—O—)— | 30 | 60 |
| | | $CH_2$*** | | |
| —OH | 100 | —CSSφ | 130 | 50 |
| >Hg (Conjugate bond) | 95 | —CSOφ, COSφ | 80 | 50 |
| —NH—NH—, —O—CO—O— | 80 | —NO | 50 | 50 |
| —N<(—$NH_2$, —NHφ, —Nφ_2) | 70 | —O—$NO_2$ | 60 | 40 |
| >CO | 65 | —NC | 40 | 40 |
| —COOφ, Naphthalene ring, Quinoline ring | 60 | —Sb=Sb— | 90 | 30 |
| >C=NH | 50 | —As=As— | 60 | 30 |
| —O—O— | 40 | —P=P—, —NCO | 30 | 30 |
| —N=N— | 30 | —O—NO, —SH, —S— | 40 | 20 |
| —O— | 20 | —I | 80 | 10 |
| Benzene ring (general aromatic single ring) | 15 | —Br | 60 | 10 |
| Ring (general non-aromatic single ring) | 10 | =S | 50 | 10 |

TABLE A-continued

| Substituent | Inorganicity Value | Organicity and Inorganicity Substituent | Value | |
|---|---|---|---|---|
| | | | Organicity | Inorganicity |
| triple bond | 3 | —Cl | 40 | 10 |
| double bond | 2 | —F | 5 | 5 |
| | | Iso branch** | −10 | 0 |
| | |  | | |
| | | Tert branch** | −20 | 0 |
| | |  | | |

*acyclic,
**terminal,
***The value of the group in [ ]
R: alkyl group,
φ: phenyl group The carbon atom of in the column of Inorganicity substituents is calculated as a Organicity value. The carbon atom in the column of Organicity & Inorganicity needs to to be calculated.

Said inorganicity/organicity ratio of water-soluble organic solvents, as described in the present invention, refers to the ratio defined in Yoshio Koda "Yuki Gainen Zu (Organic Conceptual Diagram)", Sankyo Shuppan, 1985, and it is possible to obtain said ratio utilizing the calculation method described in the same.

The water-soluble organic solvents of the present invention are solvents which are soluble in 25° C. of water at least 10% by weight in the condition of an equilibrium sate.

Listed as water-soluble organic solvents of the present invention are examples described below.

| | Inorganicity/Organicity Ratio |
|---|---|
| Glycerin | 5.0 |
| Ethylene glycol | 5.0 |
| Propylene glycol | 3.3 |
| Diethylene glycol | 2.8 |
| 1,2-Pentanediol | 2.0 |
| Dipropylene glycol | 1.8 |
| Ethylene glycol monomethyl ether | 2.0 |
| Ethylene glycol monoethyl ether | 1.5 |
| Diethylene glycol monobutyl ether | 0.9 |
| Triethylene glycol monobutyl ether | 0.8 |

Further, in the present invention, it is possible to employ alcohols (for example, methanol, ethanol, propanol, isopropanol, butanol, isobutanol, secondary butanol, tertiary butanol, pentanol, hexanol, cyclohexanol, and benzyl alcohol); polyhydric alcohols (for example, thiodiglycol); polyhydric alcohol ethers (for example, ethylene glycol monoethyl ether, ethylene glycol monophenyl ether, diethylene glycol monomethyl ether, diethylene glycol monoethyl ether, diethylene glycol dimethyl ether, propylene glycol monomethyl ether, dipropylene glycol monomethyl ether, ethylene glycol monomethyl ether acetate, triethylene glycol monomethyl ether, triethylene glycol monoethyl ether, triethylene glycol monobutyl ether, triethylene glycol dimethyl ether, and tripropylene glycol dimethyl ether); amines (for example, ethanolamine, diethanolamine, triethanolamine, N-methyldiethanolamine, N-ethyldiethanolamine, morpholine, N-ethylmorpholine, ethylenediamine, diethylenediamine, triethylenetertamine, tetraethylenepentamine, polyethyleneimine, pentamethyldiethylenetetramine, and tetramethylpropylenediamine); amides (for example, formamide, N,N-dimethylformamide, and N,N-dimeyhylacetoamide); heterocycles (for example, 2-pyrrolidone, N-methyl-2-pyrrolidone, N-cyclohexyl-2-purrolidone, 2-oxazolidone, and 1,3-dimethyl-2-imidazolidinoe); and sulfoxides (for example, dimethylsulfoxide).

The adhesive agents in the ink flow channel and at the nozzle plate of the recording head of the present invention are epoxy based adhesive agents. From the point of adhesion strength, a combination of epoxy resins and hardening agents is preferably employed. Preferable epoxy adhesives are those having 150 to 250 epoxy equivalents. Examples of preferred hardening agents are; aliphatic amines, alicyclic amines, and dicyandiamide.

Listed as preferable examples of epoxy resins are specific compounds described below.

| Name | Chemical Structure | Quality of Resin | |
|---|---|---|---|
| | | Epoxy Equivalent (g/eq) | Softening Point (° C.) |
| Bisphenol A type *1) S-1 | | 178 to 5000 | liquid state to 154 |
| Phenol Novolak type *2) S-2 | | 178 | (semi-solid) |
| ortho-Cresol Novolak type *3) S-3 | | 210 | 68 |
| DPP Novolak type *4) S-4 | | 201 | 65 |

-continued

| | | Quality of Resin | |
|---|---|---|---|
| Name | Chemical Structure | Epoxy Equivalent (g/eq) | Softening Point (° C.) |
| Tris-hydroxy-phenylmethane type *5) S-5 | | 176 | 53 |
| Tetraphenyl-ethane type *6) S-6 | | 196 | 92 |
| Bisphenol AF type (fluorinated epoxy) S-7 | | | |

(Liquid: 230 to 240 g/eq manufactured by Yuka Shell Epoxy Co., Ltd.)

Glycidyl Ethers

S-8 BA Resin

S-9 bisphenol F diglycidyl ether

S-10 brominated BA resin

S-11 novolak glycidyl ether

-continued

| | | Quality of Resin | |
|---|---|---|---|
| | | Epoxy Equivalent (g/eq) | Softening Point (° C.) |
| Name | Chemical Structure | | |

[Chemical structure of a phenol novolac-type triglycidyl ether]

S-12 glycidyl hexahydrophthalate

[Chemical structure]

S-13 glycidyl timate

[Chemical structure]

Glycidyl Amines

S-14 triglycidyl isocyanurate

[Chemical structure]

S-15 tertaglycidyldiaminodipenylmethane

[Chemical structure]

-continued

| Name | Chemical Structure | Quality of Resin | |
|---|---|---|---|
| | | Epoxy Equivalent (g/eq) | Softening Point (° C.) |

Straight Chain Aliphatic Epoxides

S-16 epoxidated polybutadiene

—CH$_2$CH—CHCH$_2$CH$_2$CH—CHCH$_2$CH$_2$CH=CHCH—CH$_2$CHCH$_2$—CH—
  |         |              \\O/                              \\CH   \\CH
  OH      OCOCH$_3$                                          O—CH$_2$  O—CH$_2$

S-17 epoxidated soybean oil

CH$_2$OC(CH$_2$)$_n$CH—CH(CH$_2$)$_n$CH$_3$
   ||            \\O/
   O
CH$_2$OC(CH$_2$)$_n$CH—CH(CH$_2$)$_n$CH$_3$
   ||            \\O/
   O
CH$_2$OC(CH$_2$)$_n$CH—CH(CH$_2$)$_n$CH$_3$
   ||            \\O/
   O

Alicyclic Epoxides

S-18 3,4-epoxy-6-methylcyclohexyl methyl carboxylate

S-19 3,4-epoxycyclohexyl methyl carboxylate

*1) Epicoat 825, 827, 828, 834, 1001, 1002, 1004, 1007, 1009, and 1010 (manufactured by Yuka Shell Epoxy Co., Ltd.)
*2) Epicoat 154 (manufactured by Yuka Shell Epoxy Co., Ltd.)
*3) Epicoat 180S56 (manufactured by Yuka Shell Epoxy Co., Ltd.)
*4) Epicoat 157S65 (manufactured by Yuka Shell Epoxy Co., Ltd.)
*5) Epicoat 1033S50 (manufactured by Yuka Shell Epoxy Co., Ltd.)
*6) Epicoat 1031S (manufactured by Yuka Shell Epoxy Co., Ltd.)

Listed as preferred examples of hardening agents are those described below.

Basic
aliphatic polyamines and alicyclic polyamines
aromatic polyamines and polyamides

H$_2$NCH$_2$CH$_2$NCH$_2$CH$_2$NH$_2$
            |
            H

H-1

H-2

H-3

H$_2$NCH$_2$—(NHCH$_2$CH$_2$)$_3$—NH$_2$

H-4

-continued

H-5

H-6

H-7

H-8

H-9

H-10

H-11

H-12

(isomer mixture)

H-13

H-14

H-15

-continued

H-16

H-17

Acidic
acid anhydrides and phenol

H-18 phthalic anhydride

H-19 tetrahydromethylphthalic anhydride

H-20 hexahydrophthalic anhydride

H-21 trimellitic acid anhydride

H-22 methylnadic anhydride

H-23 phenolnovolak

Neural
polymercaptan

-continued

H-24

MP-3-800LC

H-25 polysulfide
Catalyst type(Addition Polymerization type)
Tertiary amines and Lewis acid complexes

H-26 tris(dimethlaminomethyl)phenol(DMP-30)

H-27

2-rthyl-4-methylimidazole

H-28
$BF_3 \cdot C_2H_5NH_2$ boron trifluoride-ethylamine complex

In the present invention, colorants, which are dispersible or soluble in water, were incorporated into the ink. Listed as said colorants are, for example, pigments, acidic dyes, direct dyes, basic dyes, reactive dyes, and food dyes. Of these, from the viewpoint of glossiness as well as image retention properties, pigments or acidic dyes are preferred, and pigments are particularly preferred.

Employed as dyes capable of being used in the present invention may be any of those known in the art. Representative dyes are listed below. However, the present invention is not limited to these examples.

<Acidic Dyes>
C.I. Direct Yellow 1, 4, 8, 11, 12, 24, 26, 27, 28, 33, 39, 44, 50, 58, 85, 86, 100, 110, 120, 132, 142, and 144
C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343
C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237
C.I. Direct Black 2, 3, 7, 17, 19, 22, 32, 38, 51, 56, 62, 71, 74, 75, 77, 105, 108, 112, 117, and 154

<Acidic Dyes>
C.I. Acid Yellow 2, 3, 7, 17, 19, 23, 25, 20, 38, 42, 49, 59, 61, 72, and 99
C.I. Acid Orange 56 and 64
C.I. Acid Red 1, 8, 14, 18, 26, 32, 37, 42, 52, 57, 72, 74, 80, 87, 115, 119, 131, 133, 134, 143, 154, 186, 249, 254, and 256
C.I. Acid Violet 11, 34, and 75
C.I. Acid Blue 1, 7, 9, 29, 87, 126, 138, 171, 175, 183, 234, 236, and 249
C.I. Acid Green 9, 12, 19, 27, and 41
C.I. Acid Black 1, 2, 7, 24, 26, 48, 52, 58, 60, 94, 107, 109, 110, 119, 131, and 155

<Reactive Dyes>
C.I. Reactive Yellow 1, 2, 3, 14, 15, 17, 37, 42, 76, 95, 168, and 175
C.I. Reactive Red 2, 6, 11, 21, 22, 23, 24, 33, 45, 111, 112, 114, 180, 218, 226, 228, and 235
C.I. Reactive Blue 7, 14, 15, 18, 19, 21, 25, 38, 49, 72, 77, 176, 203, 220, 230, and 235
C.I. Reactive Orange 5, 12, 13, 35, and 95,
C.I. Reactive Brown 7, 11, 33, 37, and 46
C.I. Reactive Green 8 and 19
C.I. Reactive Violet 2, 4, 6, 8, 21, 22, and 25
C.I. Reactive Black 5, 8, 31, and 39

<Basic Dyes>
C.I. Basic Yellow 11, 14, 21, and 32
C.I. Basic Red 1, 2, 9, 12, and 13
C.I. Basic Violet 3, 7, and 14
C.I. Basic Blue 3, 9, 24, and 25

Other than those as cited above, listed as dyes capable of being employed in the present invention may be chelate dyes and azo dyes which are employed in so-called silver dye bleach method light-sensitive materials (for example, Cibachrome, manufactured by Ciba-Geigy).

Chelate dyes are described, for example, in British Patent No. 1,077,484.

Azo dyes of said silver dye bleach method light-sensitive materials are described, for example, in British Patent Nos. 1,039,458, 1,004,957, and 1,077,628, and U.S. Pat. No. 2,612,448.

Employed as pigments capable of being used in the present invention may be organic and inorganic pigments, conventionally known in the art. Listed as examples are azo pigments such as azo lakes, insoluble azo pigments, condensation azo pigments, and chelate-azo pigments; polycyclic pigments such as phthalocyanine pigments, perylene and perylene pigments, anthraquinone pigments, quinacridone pigments, dioxazine pigments, thioindigo pigments, isoindolinone pigments, and quinophtharony pigments; dye lakes such as basic dye lakes and acidic dye lakes, organic pigments such as nitro pigments, nitoroso pigments, aniline black, and daylight fluorescence pigments; and inorganic pigments such as carbon black.

Specific organic pigments are described below.

Listed as dyes for magenta, or red, are C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Listed as pigments for orange or yellow are C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, and C.I. Pigment Yellow 138.

Listed as pigments for green or cyan are C.I. Pigment Blue 15, C.I. Pigment Blue 15:2, C.I. Pigment Blue 15:3, C.I. Pigment Blue 16, C.I. Pigment Blue 60, and C.I. Pigment Green 7.

From the viewpoint of ejection stability, it is preferable to employ the following water-soluble resins as water-soluble polymer dispersants.

The water-soluble resins are preferably soluble at least 1 weight % in alkaline water of pH 9.0.

Those preferably employed as said water-soluble resins include styrene-acrylic acid-alkyl acrylate copolymers, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic acid half ester copolymers, vinylnaphthalene-acrylic acid copolymers, and vinylnaphthalene-maleic acid copolymers.

The content of said water-soluble resins with respect to the total of said ink is preferably from 0.1 to 10 percent by weight, and is more preferably from 0.3 to 5 percent by weight.

Said water-soluble resins may be employed in combination of two or more types.

The content of colorants, which are dispersible or soluble in water employed in the ink of the present invention, is preferably from 1 to 10 percent by weight with respect to the total weight of said ink.

As devices to disperse said pigments, it is possible to employ various types such as ball mills, sand mills, attriters, roll mills, agitators, Henschel mixers, colloid mills, ultrasonic homogenizers, bar mills, wet type jet mills, and paint shakers.

With the purpose to coarse particles of pigment dispersion of the present invention, preferably employed are centrifuges and filters.

The average particle diameter of pigments of the present invention refers to number average particle diameter.

The particle size distribution was obtained through observation employing an electron microscope.

The weight by percent of particles at a particle diameter of at least 400 nm was obtained by multiplying the frequency of said particle size distribution by the cube of the particle diameter.

In the present invention, ink may comprise surface active agents. Listed as surface active agents preferably employed in the present invention are anionic surface active agents such as dialkylsulfosuccinic acid salts, alkylnaphthalenesulfonic acid salts, and fatty acid salts; nonionic surface active agents such as polyoxyethylene alkyl ethers, polyoxyethylene allyl ethers, acetylene glycols, and polyoxypropylene block copolymers; and cationic surface active agents such as alkylamine salts and quaternary ammonium salts. Specifically, anionic surface active agents may be preferably employed.

The surface tension of the water-based ink of the present invention is measured at 25° C. with a measuring apparatus such as CBVP Surfacetentionemeter A3 made by Kyowa Interface Science Co., Ltd.

The water absorbance of the adhesive of the present invention can be measured as follows: A fixed amount of an adhesive is immersed in water at 70° C. for 7 days. Then an increased percentage of the weight was measured.

The amount of water absorbance of the adhesive of the present invention is preferably not more than 5%, more preferably not more than 2%. The minimum value of water absorbance is not limited, but preferably is not less than 0.0%.

EXAMPLES

The present invention will be specifically described by showing examples. However, the present invention is not limited to these examples.

Example 1

(Preparation of Head)

Figure 1:
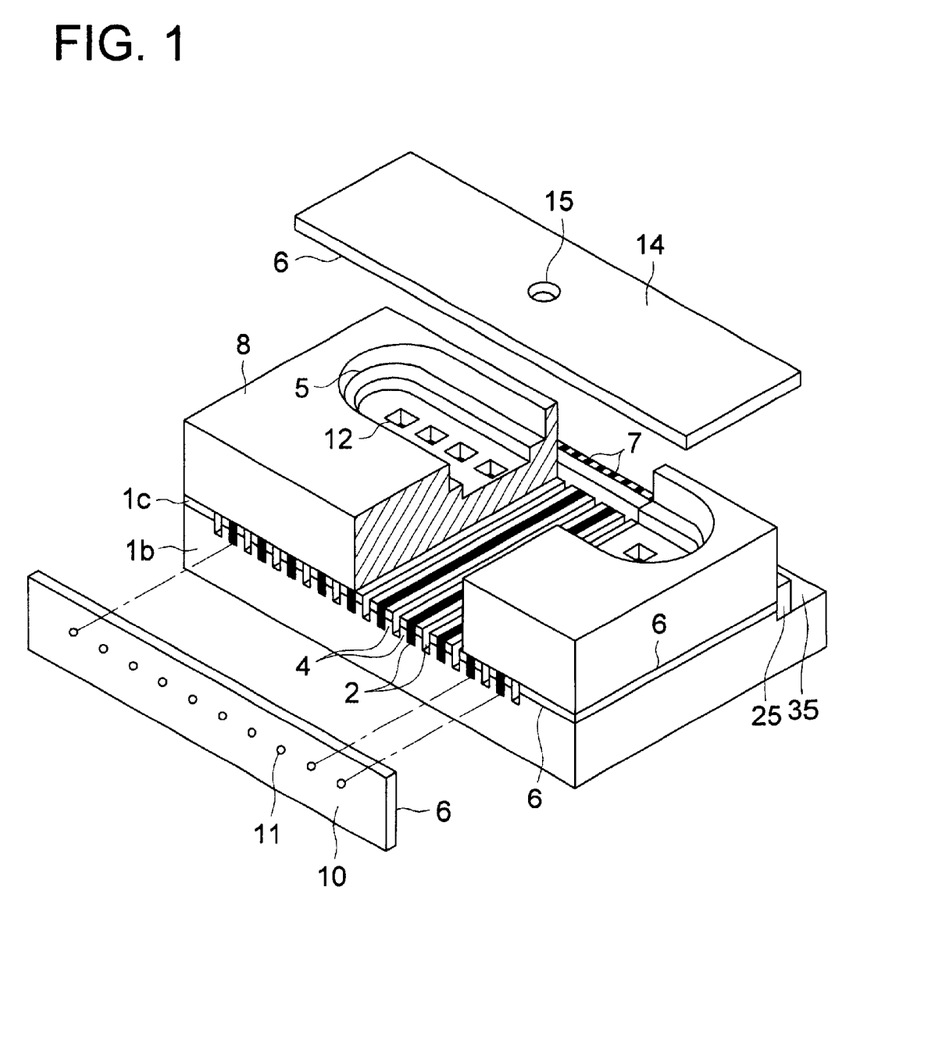
FIG. 1 is a schematic perspective view showing the partial broken-out section of the head employed in the present invention.
Figure 2:
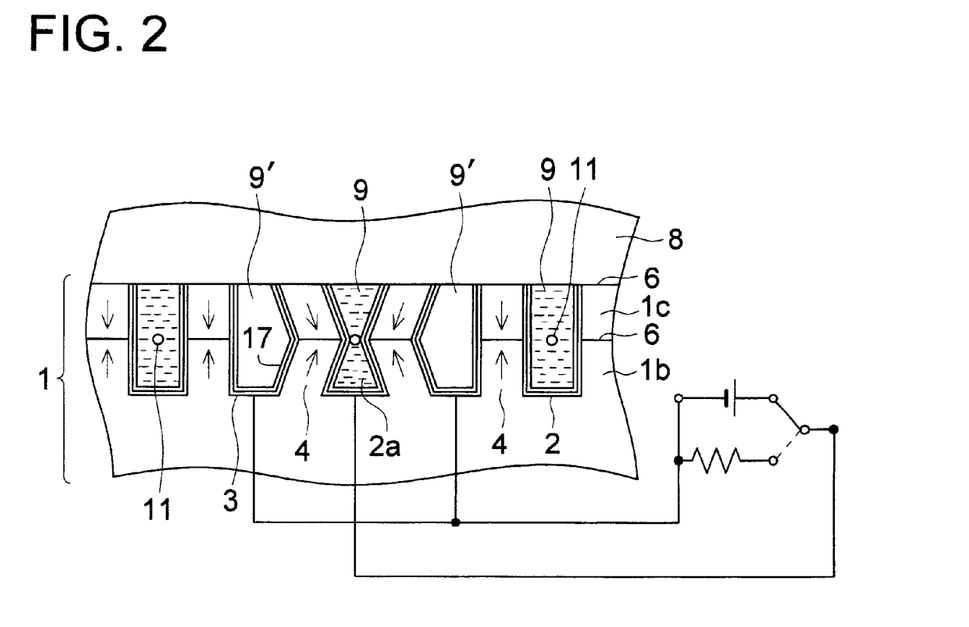
FIG. 2 is a schematic cross-sectional view showing one sample of the part of the ink chamber of the head employed in the present invention.

The head in the ink-jet printer shown in FIGS. 1 and 2, employed in the present invention, will now be described. FIG. 1 is a schematic perspective view showing the partial broken-out section of the head employed in the present invention. FIG. 2 is a schematic cross-sectional view showing one example of the part of the ink chamber of the head employed in the present invention.

Said head is formed by adhering lower substrate 1b comprised of titanic acid zirconic acid lead as the piezoelectric material to upper substrate 1c employing adhesive agent 6. Said lower substrate 1b and said upper substrate 1c are polarized in the reverse direction as shown by the arrows in Table 2. A plurality of long and narrow grooves 2 is formed across said upper substrate and said lower substrate. Accordingly, a plurality of parallel partitions 4 and grooves 2 is formed.

Electrode layer 3 is provided on the interior surface of a plurality of said grooves employing vacuum evaporation. After providing said electrode layer 3 onto said groove 2, step section 35 is formed by machining a part of the upper surface of substrate 1. Lid 8 is adhered onto the upper surface of partition 4 employing adhesive agent 6, and groove sealing piece 25 is adhered onto the end surface of partition 4 employing an adhesive agent. Insulating layer 17, such as a parylene, is applied onto the surface of electrode layer 3 formed on the interior surface of a plurality of said grooves, and subsequently, the surface of said insulating layer 17 is made to be hydrophilic utilizing an oxygen plasma treatment. Due to said hydrophilic treatment, air bubbles tend not to remain in a head, enhancing ejection stability. Nozzle plate 10, having nozzle holes 11, is adhered onto the end surface of the opening of groove 2 employing the aforementioned adhesive agent, and an ink chamber is formed in every other groove 2. Said nozzle hole is provided corresponding to each ink chamber, and namely is provided in every other corresponding to groove 2. Common groove 5 is formed in the upper part of lid 8, and holes 12, one of which passes through each ink chamber, is provided. Every other groove 2 is provided with nozzle hole 11 as well as passing hole 12. Upper plate 14 having ink supply hole 15 is adhered onto the upper part of lid 8, employing adhesive agent 6 so as to cover the upper part of common groove 5.

Each electrode layer is connected to outgoing wiring 7 which is exposed in step section 35 of lid 8.

Ink chamber 9 formed in every other groove 2, arranged in parallel as shown in FIGS. 1 and 2, is filled with ink which is supplied from ink supply hole 15. No ink is supplied to dummy groove 9' adjacent to both ink chambers.

Electric signals are transmitted to outgoing wiring 7. When a driving voltage is applied between the electrode layer of ink chamber 2a and the electrode layer of the dummy groove adjacent to both ink chambers so that the electrode layer of said ink chamber is subjected to a high electric potential, the partition of both sides of ink chamber 2a is deformed inward and said ink chamber is subjected to contraction so that ink is ejected as small droplets. Subsequently, when the electrode layer is grounded, said ink chamber is released from deformation so that said ink is withdrawn into said ink chamber.

Incidentally, employed as adhesive agent 6 was a combination of epoxy resin S6, and H-11 as the hardening agent.

(Preparation of Ink)

(Yellow Pigment Dispersion)

| | |
|---|---|
| C.I. Pigment Yellow 74 | 95 g |
| Demol C (manufactured by Kao Co., Ltd.) | 65 g |
| Ethylene glycol | 100 g |
| Deionized water | 120 g |
| were mixed and dispersed employing a sand grinder filled with 0.5 mm zirconia beads in a volume ratio of 50 percent, whereby | | a yellow pigment dispersion was prepared.

The resulting deposit was removed employing a centrifuge.

(Magenta Pigment Dispersion)

| | |
|---|---|
| C.I. Pigment Red 122 | 105 g |
| Johncryl 61 (Acryl-Styrene based resin, manufactured by Johnson Co.) | 60 g |
| Glycerin | 100 g |
| Deionized water | 130 g |
| were mixed and dispersed employing a sand grinder filled with 0.5 mm zirconia beads in a volume ratio of 50 percent, whereby a magenta pigment dispersion was prepared. | |

The resulting deposit was removed employing a centrifuge.

(Cyan Pigment Dispersion)

| | |
|---|---|
| C.I. Pigment Blue 15:3 | 100 g |
| Demol C | 68 g |
| Diethylene glycol | 100 g |
| Deionized water | 125 g |
| were mixed and dispersed employing a sand grinder filled with 0.5 mm zirconia beads in a volume ratio of 50 percent, whereby a cyan pigment dispersion was prepared. | |

The resulting deposit was removed employing a centrifuge.

(Cyan Pigment Dispersion 2)

Cyan Pigment Dispersion 2 was prepared employing the same processes as above, except that centrifugal separation was not carried out.

(Ink 1)

| | |
|---|---|
| Yellow Pigment Dispersion | 110 g |
| Nipol LX844 (40 percent solids, manufactured by Nippon Zeon Co., Ltd.) | 50 g |
| Ethylene glycol | 200 g |
| Propylene glycol | 150 g |
| Olfin 1010 (manufactured by Nisshin Kagaku Co., Ltd.) | 4 g |
| Proxel GXL (manufactured by Zeneca Pharmaceuticals) | 2 g |
| Sodium dioctylsulfosuccinate | 0.1 g |
| Sodium chloride | 0.6 g |

The total volume of these compounds was adjusted to 1 liter by adding deionized water and the resulting mixture was well stirred. Subsequently, the resulting mixture was passed twice through a Millipore filter filtering device with a hole diameter of 1 micron, whereby Ink 1 was prepared.

The average particle diameter of said pigment was 122 nm. The ratio of particles, having a particle diameter of at least 400 nm, was 0.2 percent.

Incidentally, said particle diameter was determined employing Zeta Sizer 1000, manufactured by Malvern Instruments Inc.

(Ink 2)

| | |
|---|---|
| Magenta Pigment Dispersion | 140 g |
| Nipol SX1105 (45 percent solids, manufactured by Nippon Zeon Co., Ltd.) | 56 g |
| Ethylene glycol | 150 g |
| Diethylene glycol | 120 g |
| Pelex OT-P manufactured by Kao Corp.) | 4 g |
| Prokiseru GXL | 2 g |
| Sodium hydroxide | 0.1 g |
| Sodium dioctylsulfosuccinate | 0.1 g |
| Potassium nitrate | 1.8 g |

The total volume of these compounds was adjusted to 1 liter by adding deionized water and the resulting mixture was sufficiently stirred. Subsequently, the resulting mixture was passed twice through a Millipore filter filtering device with a hole diameter of 1 micron, whereby Ink 1 was prepared.

The average particle diameter of the pigment in obtained Ink 2 was 85 nm. The ratio of particles, having a particle diameter of at least 400 nm, was 0.1 percent.

(Ink 3)

| | |
|---|---|
| Cyan Pigment Dispersion | 110 g |
| Takerack W-605 (30 percent solids, manufactured by Takeda Yakuhin Kogyo Ltd.) | 267 g |
| Ethylene glycol | 100 g |
| Diethylene glycol | 140 g |
| Emulgen 913 | 4 g |
| Prroxel GXL | 2 g |
| Sodium dioctylsulfosuccinate | 0.1 g |
| Sodium chloride | 0.8 g |
| Potassium chloride | 0.3 g |

The total volume of these compounds was adjusted to 1 liter by adding deionized water and the resulting mixture was sufficiently stirred. Subsequently, the resulting mixture was passed twice through a Millipore filter filtering device with a hole diameter of 1 micron, whereby Ink 3 was prepared.

The average particle diameter of the pigment of obtained Ink 3 was 105 nm. The ratio of particles, having a particle diameter of at least 400 nm, was 0.5 percent by weight.

(Ink 4, Ink 5, and Ink 6)

Ink 4, Ink 5, and Ink 6 were prepared in the same manner as Ink 1, Ink 2, and Ink 3, respectively, except that water soluble organic solvents were varied as shown in Table 1 and Table 2.

(Ink 7, Ink 8, and Ink 9)

Ink 7, Ink 8, and Ink 9 were prepared in the same manner as Ink 1, Ink 2, and Ink 3, respectively, except that water-soluble organic solvents were varied as shown in Tables 1 and 2.

(Ink 10, Ink 11, and Ink 12)

Ink 10, Ink 11, and Ink 12 were prepared in the same manner as Ink 1, Ink 2, and Ink 3, respectively, except that water-soluble organic solvents were varied as shown in Tables 1 and 2.

(Ink 13)

Ink 13 was prepared in the same manner as Ink 12, except that cyan pigment dispersion was not subjected to filtration.

The average particle diameter of obtained pigment dispersions was 110 nm. The ratio of particles, having a particle diameter of at least 400 nm, was 2.5 percent by weight.

(Ink 14)

Ink 14 was prepared in the same manner as Ink 12, except that sodium dioctylsulfosuccinate was not added.

(Test Method of Durability of Head)

Said head was immersed in each ink and was set aside at 60° C. for 3 days in a tightly sealed state.

Thereafter, a solid image printing test was carried out employing the same ink as above and QP Paper (manufactured by Konica Corp.) for 8 hours at an ejection amount of 6 Pico liter and a driving frequency of 30 kHz.

A: after printing, no damage was noticed in the head
B: after printing, damage was noticed in the head
C: prior to printing, damage of the adhesion of the head was noticed.

(Unevenness of Image)

Printing results were evaluated as described below.
A: uniform image was obtained
B: continuous streaking was noticed at the position of one nozzle
C: continuous streaking was noticed at the position of several nozzles.

The evaluation results are shown in Table 3.

Example 2

An another test was carried out by using the ink No. 15 which has the same composition as ink No. 12, and an adhesive of a mixture of (a) epoxy resin S-9 and (b) hardening agent H-16 & H-11. The evaluation items were the same as in Example 1.

TABLE 1

| | Formula of Dispersion | | |
|---|---|---|---|
| Ink No. | | Solvent (I/O) | Content Ratio of Solvent |
| 1 (Yellow) | Yellow Pigment Dispersion | EG(5.0) | 100/380 |

TABLE 1-continued

| | Formula of Dispersion | | |
|---|---|---|---|
| Ink No. | | Solvent (I/O) | Content Ratio of Solvent |
| 2 (Magenta) | Magenta Pigment Dispersion | GR(5.0) | 100/395 |
| 3 (Cyan) | Cyan Pigment Dispersion | DEG(2.8) | 100/393 |
| 4 (Yellow) | Yellow Pigment Dispersion | EG(5.0) | 100/380 |
| 5 (Magenta) | Magenta Pigment Dispersion | GR(5.0) | 100/395 |
| 6 (Cyan) | Cyan Pigment Dispersion | DEG(2.8) | 100/393 |
| 7 (Yellow) | Yellow Pigment Dispersion | EG(5.0) | 100/380 |
| 8 (Magenta) | Magenta Pigment Dispersion | GR(5.0) | 100/395 |
| 9 (Cyan) | Cyan Pigment Dispersion | DEG(2.8) | 100/393 |
| 10 (Yellow) | Yellow Pigment Dispersion | EG(5.0) | 100/380 |
| 11 (Magenta) | Magenta Pigment Dispersion | GR(5.0) | 100/395 |
| 12 (Cyan) | Cyan Pigment Dispersion | DEG(2.8) | 100/393 |
| 13 (Cyan) | Cyan Pigment Dispersion 2 | DEG(2.8) | 100/393 |
| 14 (Cyan) | Cyan Pigment Dispersion | DEG(2.8) | 100/393 |
| 15 (Cyan) | Cyan Pigment Dispersion | DEG(2.8) | 100/393 |

EG: ethylene glycol
GR: glycerin
DEG: diethylene glycol
TGBE: triethylene glycol monobutyl ether
Surface Tension of Ink
The surface tension of Inks 1 through 13 was from 30 to 40 dyn/cm.
The surface tension of Ink 14 was 42 dyn/cm.
Herein, dyn means $1 \times 10^{-5}$ N.

TABLE 2

| | Formula of Ink | | | | | | | | |
|---|---|---|---|---|---|---|---|---|---|
| Ink No. | Weight of Dispersion (g) | Organic Solvent of Dispersion (g) | Organic Solvent 1 (in g) | Organic Solvent 2 (in g) | Solvent Amount of $0.5 \leq I/O \leq 2.4$ | Content Ratio of $0.5 \leq I/O \leq 2.4$ | Solvent Amount of $2.5 \leq I/O \leq 5$ | Content Ratio of $2.5 \leq I/O \leq 5$ | |
| 1 (Yellow) | 110 | 29 | EG(200) | PG(150) | 0 | 0 | 379 | 37.9 | Inv. |
| 2 (Magenta) | 140 | 35.4 | EG(150) | DEG(120) | 0 | 0 | 305 | 30.5 | Inv. |
| 3 (Cyan) | 110 | 28 | EG(100) | DEG(140) | 0 | 0 | 268 | 26.8 | Inv. |
| 4 (Yellow) | 110 | 29 | EG(200) | EGME(160) | 160 | 16 | 229 | 22.9 | Comp. |
| 5 (Magenta) | 140 | 35.4 | EG(150) | EGME(160) | 160 | 16 | 185 | 18.5 | Comp. |
| 6 (Cyan) | 110 | 28 | EG(100) | EGME(160) | 160 | 16 | 128 | 12.8 | Comp. |
| 7 (Yellow) | 110 | 29 | EG(200) | EGME(100) | 100 | 10 | 229 | 22.9 | Inv. |
| 8 (Magenta) | 140 | 35.4 | EG(150) | EGME(100) | 100 | 10 | 185 | 18.5 | Inv. |
| 9 (Cyan) | 110 | 28 | EG(100) | EGME(100) | 100 | 10 | 128 | 12.8 | Inv. |
| 10 (Yellow) | 110 | 29 | EG(250) | PD(20) | 20 | 2 | 279 | 27.9 | Inv. |
| 11 (Magenta) | 140 | 35.4 | EG(200) | PD(20) | 20 | 2 | 253 | 23.5 | Inv. |
| 12 (Cyan) | 110 | 28 | EG(150) | PD(20) | 20 | 2 | 178 | 17.8 | Inv. |
| 13 (Cyan) | 110 | 28 | EG(150) | PD(20) | 20 | 2 | 178 | 17.8 | Inv. |
| 14 (Cyan) | 110 | 28 | EG(150) | PD(20) | 20 | 2 | 178 | 17.8 | Inv. |
| 15 (Cyan) | 110 | 28 | EG(150) | TGBE(180) | 80 | 8 | 178 | 17.8 | Inv. |

Inv.; Present Invention, Comp.; Comparative Example
EG: ethylene glycol DEG: diethylene glycol PG: propylene glycol
EGME: ethylene glycol monoethyl ether PD: 1,2-pentanediol
TGBE: triethylene glycol monobutyl ether
Surface Tension of Ink
The surface tension of Inks 1 through 13 was from 30 to 40 dyn/cm.
The surface tension of Ink 14 was 42 dyn/cm. Herein, dyn means $1 \times 10^{-5}$ N.

TABLE 3

| Ink No. | Durability Test of Head | Image Unevenness |
| --- | --- | --- |
| 1 | A | B |
| 2 | A | B |
| 3 | A | B |
| 4 | C | B |
| 5 | C | B |
| 6 | C | B |
| 7 | B | A |
| 8 | B | A |
| 9 | B | A |
| 10 | A | A |
| 11 | A | A |
| 12 | A | A |
| 13 | B | B |
| 14 | A | B |
| 15 | A | A |

EFFECTS OF THE INVENTION

As proved by the examples, the ink-jet recording method according to the present invention exhibits excellent effects in which injection stability is improved without shortening the working life of the head of a high speed printer.

What is claimed is:

1. An ink-jet recording method, comprising the step of:
   jetting a water-based ink from an ink chamber through a nozzle bole to an ink-jet recording media;
   wherein the ink chamber contacting with the water-based ink is constructed by jointing plural construction members with an epoxy adhesive, the epoxy adhesive having an epoxy equivalent of about 150 to about 250; and
   wherein the water-based ink contains a coloring material, a first organic solvent, and a second organic solvent having properties of:
   (1) a weight ratio of both the first organic solvent and the second organic solvent to the total weight of the water-based ink being 10 to 50%;
   (2) a ratio of an inorganicity to an organicity being 0.5 to 2.4 for the first organic solvent and 2.5 to 5.0 for the second organic solvent; and
   (3) a weight ratio to a total weight of the water-based ink being 0 to 15% for the first organic solvent and 5 to 50% for the second organic solvent.

2. The ink-jet recording method of claim 1, wherein a driving frequency of an ink-jet recording head is not less than 15 kHz.

3. The ink-jet recording method of claim 1, wherein the water-based ink contacts with an ink flow channel plate or a nozzle hole plate.

4. The ink-jet recording method of claim 1, wherein the water-based ink contacts with an ink flow channel plate and a nozzle hole plate.

5. The ink-jet recording method of claim 1, wherein the weight ratio of the first organic solvent to the total weight of the water-based ink is 1 to 8%.

6. The ink-jet recording method of claim 1, wherein the weight ratio of the second organic solvent to the total weight of the water-based ink is 5 to 30%.

7. The ink-jet recording method of claim 1, wherein the coloring material in the water-based ink is a pigment.

8. The ink-jet recording method of claim 1, wherein a surface tension of the water-based ink is $3.0 \times 10^{-4}$ to $4.0 \times 10^{-4}$ N/cm.

9. The ink-jet recording method of claim 7, wherein an average particle diameter of the pigment is 10 to 200 nm.

10. The ink-jet recording method of claim 1, wherein the water-based ink further contains an anionic surfactant.

11. The ink-jet recording method of claim 1, wherein the water-based ink further contains a water-soluble polymer dispersing agent in an amount of 0.1 to 1.0 part by weight per 1.0 part by weight of the pigment.

12. The ink-jet recording method of claim 2, wherein the epoxy adhesive is applied to the ink flow channel plate and the nozzle hole plate.

13. The ink-jet recording method of claim 12, wherein the weight ratio of the first organic solvent to the total solvent weight of the ink is 1 to 8% and the weight ratio of the second organic solvent to a total solvent weight of the ink is 5 to 30%.

14. The ink-jet recording method of claim 13, wherein a surface tension of the water-based ink is $3.0 \times 10^{-4}$ to $4.0 \times 10^{-4}$ N/cm.

15. An ink-jet recording method, comprising the step jetting a water-based ink from an ink chamber through a nozzle hole to an ink-jet recording media;
   wherein the ink chamber contacting with the water-based ink is constructed by jointing plural construction members with an epoxy adhesive and a hardening agent selected from a group consisting of aliphatic amines, alicyclic amines, and dicyandiamide; and
   wherein the water-based ink contains a coloring material, a first organic solvent, and a second organic solvent having properties of:
   (1) a weight ratio of both the first organic solvent and the second organic solvent to the total weight of the water-based ink being 10 to 50%;
   (2) a ratio of an inorganicity to an organicity being 0.5 to 2.4 for the first organic solvent and 2.5 to 5.0 for the second organic solvent; and
   (3) a weight ratio to a total weight of the water-based ink being 0 to 15% for the first organic solvent and 5 to 50% for the second organic solvent.

16. An ink-jet recording method, comprising the step of:
   jetting water-based ink from an ink chamber through a nozzle hole to an ink-jet recording media,
   wherein the ink chamber contacting with the water-based ink is constructed by jointing plural construction members with an epoxy adhesive, the epoxy adhesive having epoxy equivalents of 150 to 250, and
   wherein the water-based ink contains a coloring material, a first organic solvent and a second organic solvent, and the water-based ink has properties of:
   (1) a weight ratio of both the first organic solvent and the second organic solvent to the total weight of the water-based ink being 10 to 50%;
   (2) a ratio of an inorganicity to an organicity being 0.5 to 2.4 for the first organic solvent and 2.5 to 5.0 for the second organic solvent;
   (3) a weight ratio to a total weight of the water-based ink being: 0 to 15% for the first organic solvent and 5 to 50% for the second organic solvent; and
   (4) the coloring material is pigment, and a summed weight of the pigments having a particle diameter of not less than 400 nm is not more than 2% of a total weight of the water-based ink.

17. An ink-jet recording method, comprising the step of:
   jetting water-based ink from an ink chamber through a nozzle hole to an ink-jet recording media,
   wherein the ink chamber contacting with the water-based ink is constructed by jointing plural construction members with an epoxy adhesive, the epoxy adhesive having epoxy equivalents of 150 to 250 and a water absorbance of not more than 2 weight %, and wherein the water-based ink contains a coloring material, a first organic solvent and a second organic solvent, and the water-based ink has properties of:
(1) a weight ratio of both the first organic solvent and the second organic solvent to the total weight of the water-based ink being 10 to 50%;
(2) a ratio of an inorganicity to an organicity being 0.5 to 2.4 for the first organic solvent and 2.5 to 5.0 for the second organic solvent; and
(3) a weight ratio to a total weight of the water-based ink being 0 to 15% for the first organic solvent and 5 to 50% for the second organic solvent.

18. An ink-jet recording method, comprising the step of: jetting a water-based ink from an ink chamber through a nozzle hole to an ink-jet recording media, wherein the ink chamber contacting with the water-based ink is constructed by jointing plural construction members with an epoxy adhesive and a hardening agent selected from the group consisting of aliphatic amines, alicyclic amines, and dicyandiamide, and wherein the water-based ink contains a coloring material, a first organic solvent and a second organic solvent, and the water-based ink has properties of:
(1) a weight ratio of both the first organic solvent and the second organic solvent to the total weight of the water-based ink being 10 to 50%;
(2) a ratio of an inorganicity to an organicity being 0.5 to 2.4 for the first organic solvent and 2.5 to 5.0 for the second organic solvent;
(3) a weight ratio to a total weight of the water-based ink being 0 to 15% for the first organic solvent and 5 to 50% for the second organic solvent; and
(4) the coloring material is pigment, and a summed weight of the pigments having a particle diameter of not less than 400 nm is not more than 2% of a total weight of the water-based ink.

19. An ink-jet recording method, comprising the step of: jetting a water-based ink from an ink chamber through a nozzle hole to an ink-jet recording media, wherein the ink chamber contacting with the water-based ink is constructed by jointing plural construction members with an epoxy adhesive having a water absorbance of not more than 2 weight %, and a hardening agent selected from the group consisting of aliphatic amines, alicyclic amines, and dicyandiamide, and wherein the water-based ink contains a coloring material, a first organic solvent and a second organic solvent, and the water-based ink has properties of:
(1) a weight ratio of both the first organic solvent and the second organic solvent to the total weight of the water-based ink being 10 to 50%;
(2) a ratio of an inorganicity to an organicity being 0.5 to 2.4 for the first organic solvent and 2.5 to 5.0 for the second organic solvent; and
(3) a weight ratio to a total weight of the water-based ink being 0 to 15% for the first organic solvent and 5 to 50% for the second organic solvent.

* * * * *